United States Patent
Chaussee et al.

(10) Patent No.: US 12,344,727 B2
(45) Date of Patent: Jul. 1, 2025

(54) SILICA SUSPENSION IN AN ORGANIC SOLVENT AND METHOD FOR ITS MANUFACTURE

(71) Applicant: RHODIA OPERATIONS, Aubervilliers (FR)

(72) Inventors: Thomas Chaussee, Cailloux-sur-Fontaines (FR); Frédéric Magnin-Feysot, Saint Pierre de Chandieu (FR); Hélène Fay, Bordeaux (FR); Loïc Baussaron, Serpaize (FR); Jean-Claude Le Thiesse, Plouhinec (FR)

(73) Assignee: RHODIA OPERATIONS, Aubervilliers (FR)

( * ) Notice: Subject to any disclaimer, the term of this patent is extended or adjusted under 35 U.S.C. 154(b) by 274 days.

(21) Appl. No.: 16/965,987

(22) PCT Filed: Jan. 30, 2019

(86) PCT No.: PCT/EP2019/052260
§ 371 (c)(1),
(2) Date: Jul. 29, 2020

(87) PCT Pub. No.: WO2019/149757
PCT Pub. Date: Aug. 8, 2019

(65) Prior Publication Data
US 2020/0362138 A1 Nov. 19, 2020

(30) Foreign Application Priority Data

Feb. 1, 2018 (EP) .................... 18305103

(51) Int. Cl.
*C08K 3/36* (2006.01)
*C01B 33/145* (2006.01)
(Continued)

(52) U.S. Cl.
CPC .............. *C08K 3/36* (2013.01); *C01B 33/145* (2013.01); *C08J 3/215* (2013.01); *C09C 1/3018* (2013.01);
(Continued)

(58) Field of Classification Search
CPC ...... C08K 3/36; C01B 33/145; C01P 2006/22
See application file for complete search history.

(56) References Cited

U.S. PATENT DOCUMENTS 4,374,937 A * 2/1983 Nemcek .................. C08F 20/10
522/182
5,185,037 A 2/1993 Idemitsu et al.
(Continued)

FOREIGN PATENT DOCUMENTS

EP 396450 B1 11/1990
EP 520862 B1 12/1992
(Continued)

OTHER PUBLICATIONS

Machine translation of WO-2013129093-A1 (contained in the IDS dated Jul. 29, 2020) obtained from WIPO Patentscope. (Year: 2013).*

*Primary Examiner* — Hannah J Pak
*Assistant Examiner* — David R. Foss
(74) *Attorney, Agent, or Firm* — Osha Bergman Watanabe & Burton LLP (57) ABSTRACT

Suspensions of silica particles in organic liquids are disclosed as well as a method for their preparation.

12 Claims, 2 Drawing Sheets

Demand curve Compound (S) ref. B in n-hexadecane (51) Int. Cl.
*C08J 3/215* (2006.01)
*C09C 1/30* (2006.01)

(52) U.S. Cl.
CPC ...... *C01P 2004/62* (2013.01); *C01P 2006/22* (2013.01); *C08K 2201/005* (2013.01)

(56) References Cited

U.S. PATENT DOCUMENTS

| | | | |
|---|---|---|---|
| 5,294,233 A * | 3/1994 | Kitahara | C08K 5/29 |
| | | | 44/341 |
| 5,547,502 A | 8/1996 | Chevallier et al. | |
| 6,214,912 B1 | 4/2001 | Chevallier et al. | |
| 6,221,149 B1 | 4/2001 | Bomal et al. | |
| 6,290,924 B1 | 9/2001 | Chevallier et al. | |
| 6,335,396 B1 | 1/2002 | Chevallier et al. | |
| 6,468,493 B1 | 10/2002 | Chevallier et al. | |
| 6,702,888 B2 | 3/2004 | Bomal et al. | |
| 6,811,723 B1 * | 11/2004 | Aupaix | B82Y 30/00 |
| | | | 424/59 |
| 9,334,169 B2 | 5/2016 | Guy et al. | |
| 9,359,215 B2 | 6/2016 | Allain et al. | |
| 10,487,195 B2 | 11/2019 | Haberkorn et al. | |
| 2003/0134943 A1 * | 7/2003 | Labarre | C08J 3/226 |
| | | | 524/492 |
| 2004/0062701 A1 | 4/2004 | Valero et al. | |
| 2004/0234877 A1 * | 11/2004 | Yoshino | G03G 9/1138 |
| | | | 430/108.1 |
| 2005/0288439 A1 * | 12/2005 | Pazur | C08L 13/00 |
| | | | 525/191 |
| 2006/0075921 A1 * | 4/2006 | Richardson | B27K 3/40 |
| | | | 106/15.05 |
| 2011/0263784 A1 | 10/2011 | Valero et al. | |
| 2014/0121316 A1 | 5/2014 | Monsallier et al. | |
| 2014/0158166 A1 * | 6/2014 | Saraf | C11D 1/008 |
| | | | 510/480 |

FOREIGN PATENT DOCUMENTS

| | | |
|---|---|---|
| EP | 647591 A1 | 4/1995 |
| EP | 670813 B1 | 9/1995 |
| EP | 670814 B1 | 9/1995 |
| EP | 762992 B1 | 3/1997 |
| EP | 762993 B1 | 3/1997 |
| EP | 901986 B1 | 3/1999 |
| EP | 917519 B1 | 5/1999 |
| EP | 983966 B1 | 3/2000 |
| EP | 1355856 B1 | 10/2003 |
| WO | 0153386 A1 | 7/2001 |
| WO | 03016215 A1 | 2/2003 |
| WO | 2009112458 A1 | 9/2009 |
| WO | 2011117400 A1 | 9/2011 |
| WO | 2013129093 A1 | 9/2013 |
| WO | 2016180649 A1 | 11/2016 |
| WO | 2017211876 A1 | 12/2017 |

* cited by examiner

Figure 1: Demand curve Compound (S) ref. B in n-hexadecane

Figure 2: Demand curve Compound (S) ref. B in o-xylene

Figure 3: Demand curve Compound (S) ref. G in n-hexadecane

Figure 4: Demand curve Compound (S) ref. G in o-xylene

SILICA SUSPENSION IN AN ORGANIC SOLVENT AND METHOD FOR ITS MANUFACTURE

This application claims priority to European application EP18305103.6 filed on Jan. 2, 2018 the whole content of this application being incorporated herein by reference for all purposes.

TECHNICAL FIELD

The present invention relates to a method for preparing suspensions of silica particles in an organic liquid. The invention further relates to the suspensions thus obtained and to their use in the preparation of silica-filled polymeric compositions.

BACKGROUND ART

The use of silica as a reinforcing filler in polymeric compositions has been known for many years. For instance, silica is widely used as reinforcing filler in elastomeric compositions. Silica particles are also used in the preparation of high resistance coatings.

A problem often encountered with the use of silica particles in organic matrices, such as polymers, is the difficulty of dispersing and intimately mixing the inorganic particles with the organic matrix. Silica particles have in fact the tendency to form agglomerates that are difficult to disperse in any given polymeric matrix. It would thus be advantageous to have available suspensions of non-aggregated silica particles which could be mixed with solutions or dispersions of polymers and/or oligomers to allow intimate dispersion of the inorganic particles in the organic matrix. However, to be compatible, said silica particles suspensions should be provided in organic liquids and they should have sufficient kinetic stability that settling of the silica particles does not take place.

Methods to stabilize silica particles in organic liquids by modification of the silica surface with organic moieties are known. For instance WO01/53386A1 discloses a process for the preparation of a dispersion of mineral particles, in particular silica particles, in an organic solvent wherein a) a water-immiscible organic solvent and a transfer agent, which is partially or preferably completely soluble in the said organic solvent, are mixed with an aqueous dispersion or suspension of mineral particles, and b) the organic solvent containing the said mineral particles is separated from the aqueous phase. The transfer agent covers the surface of the mineral particle to reduce the hydrophilicity of the mineral particles and thus allowing them to transfer into the organic solvent. The method however requires a step wherein an aqueous dispersion of the inorganic particles is prepared.

WO2013/129093A1 discloses a silica sol dispersed in an organic solvent which comprises silica particles, an organic solvent and an acid phosphate ester of formula (1)

$$P=O((OCH_2CH_2)_nOR)_a(OH)_b \qquad (1)$$

wherein R represents a C1-C18 hydrocarbon group, n is an integer 0-3, a is an integer 1-2, and b is 3-a. The method for preparing the dispersion comprises a step of grinding silica particles in an organic solvent in the presence of an acid phosphate ester represented by formula (1). The dispersions are used in the preparation of coatings and the organic solvents used in the preparation of the dispersion are polar organic solvents, such as isopropanol and methyl-ethyl ketone.

It has now been found that, when the nature of the compound used to stabilize the silica particles in the organic solvent meets certain characteristics it allows the suspension of silica particles being conveniently used for the preparation of silica-filled polymer compositions, for instance by mixing of the silica particle suspension with a suspension or solution of a polymer in an organic solvent.

SUMMARY OF INVENTION

It is an object of the invention to provide suspensions of silica particles having an average particle size of less than 600 nm in organic liquids which can conveniently be used in the preparation of silica-filled polymer compositions.

A second object of the invention is a process for the preparation of said suspensions starting from precipitated silica.

A further object of the invention are compositions comprising the suspension of the silica particles.

DESCRIPTION OF INVENTION

A first object of the invention is a suspension of silica particles comprising:

a liquid [liquid (L)] selected from the group consisting of the linear or branched, saturated or unsaturated, aliphatic and cycloaliphatic hydrocarbons having from 6 to 30 carbon atoms and of the aromatic hydrocarbons having from 6 to 10 carbon atoms, silica particles, and at least one compound [compound (S)] selected from the group consisting of:

i. acid phosphate esters of formula (I), $$P(O)((OCH_2CH_2)_nOR)_a(OM)_b \qquad (I)$$

wherein:

R represents a linear or branched, saturated or unsaturated, aliphatic hydrocarbon group having from 1 to 24 carbon atoms or an aromatic hydrocarbon having from 6 to 24 carbon atoms; M is H, Na or K, n is an integer from 0 to 12, preferably from 4 to 10, more preferably from 4 to 8; a is an integer equal to 1 or 2, and b is 3-a;

ii. amines of formula (II)

$$NR^1R^2R^3 \qquad (II)$$

wherein each $R^1$, $R^2$, $R^3$ is independently selected from the group consisting of H, linear or branched, saturated or unsaturated, aliphatic hydrocarbon groups having from 1 to 24 carbon atoms, preferably from 10 to 24 carbon atoms, and —$(CH_2CH_2O)_{n^1}H$, wherein each $n^1$ is an integer from 1 to 16, with the proviso that $R^1$, $R^2$ and $R^3$ cannot be H at the same time;

iii. succinates of formula (III):

wherein $R^4$ and $R^5$ are independently selected from the group consisting of the linear or branched, saturated or unsaturated, aliphatic hydrocarbon groups having from 1 to 24 carbon atoms, preferably from 4 to 18 carbon atoms, and $M^1$ is either H or $SO_3Na$; and iv. functionalised oligomers comprising recurring units deriving from at least one conjugated diene monomer.

Compound (S) is miscible with liquid (L), in particular with n-hexadecane, in the temperature range 20-50° C.

The term "suspension" is used herein to refer to a liquid in which solid particles are dispersed, according to IUPAC definition.

The liquid in the inventive suspension, liquid (L), is selected from the group consisting of the linear or branched, saturated or unsaturated, aliphatic and cycloaliphatic hydrocarbons having from 6 to 30 carbon atoms, preferably from 6 to 24 carbon atoms and of the aromatic hydrocarbons having from 6 to 10 carbon atoms.

Notable non-limiting examples of suitable aliphatic hydrocarbons are for instance n-hexane, n-heptane, n-octane, n-nonane, n-decane, n-dodecane, n-hexadecane. Notable non-limiting examples of cycloaliphatic hydrocarbons are for instance cyclopentane, cyclohexane, cyclooctane. Liquid (L) is preferably selected among the group consisting of n-hexane, n-heptane, n-octane, n-nonane, n-decane, n-dodecane, n-hexadecane, and cyclohexane.

Notable non-limiting examples of suitable aromatic hydrocarbons are benzene, toluene, o-xylene.

Liquid (L) may be a mixture of more than one hydrocarbon as defined above.

The silica particles are present in the suspension in an amount of from 1 to 60% by weight with respect to the total weight of the suspension. The amount of silica particles is typically at least 5% by weight, preferably at least 8% by weight with respect to the total weight of the suspension. The amount of silica particles typically does not exceed 50% by weight, preferably 45% by weight, with respect to the total weight of the suspension. The amount of silica particles may advantageously be between 10 and 45% by weight, preferably between 10 and 40% by weight with respect to the total weight of the suspension.

The silica particles are characterised a particle size of less than 600 nm. The particle size is typically of at least 5 nm. Throughout the text the expression "particle size" will refer to the size corresponding to the maximum in the number particle size distribution, also defined as the "mode", measured by dynamic light scattering. The silica particle size may advantageously be in the range from 10 to 450 nm, preferably in the range from 25 to 300 nm, more preferably in the range from 25 to 200 nm. The silica particle size may be even less than 150 nm.

The silica particles are preferably precipitated silica particles. Any type of precipitated silica may be used for the preparation of the suspension. Notable, non-limiting examples of precipitated silica and processes for its preparation are disclosed for instance in EP396450A, EP520862A, EP647591A, EP670813A, EP670814A, EP901986A, EP762992A, EP762993A, EP917519A, EP983966A, EP1355856A, WO03/016215, WO2009/112458, WO2011/117400.

The precipitated silica particles are characterized by a BET specific surface area in the range from 50 to 500 m²/g, preferably from 80 to 400 m²/g, more preferably from 100 to 300 m²/g. BET surface area is determined according to the Brunauer-Emmett-Teller method as detailed in standard NF ISO 5794-1, Appendix E (June 2010).

The precipitated silica particles are characterized by a CTAB specific surface area in the range from 50 to 525 m²/g, preferably from 80 to 450 m²/g, more preferably from 100 to 350 m²/g. The CTAB specific surface provides a measure of the external surface of the silica. It can be determined according to standard NF ISO 5794-1, Appendix G (June 2010).

The amount of compound (S) in the suspension is generally calculated on the basis of the weight of silica particles to be dispersed. Typically compound (S) is present in the suspension in an amount of at least 5% by weight with respect to the dry weight of the silica particles. The amount of compound (S) may conveniently be in the range of 5 to 50% by weight with respect to the dry weight of the silica particles, preferably 5 to 40% by weight. Good results in terms of silica particle dispersion in liquid (L) were obtained with an amount of compound (S) in the range of 10 to 35% by weight with respect to the dry weight of the silica particles.

The most suitable amount of compound (S) depends, among others, on the particular type of compound (S). More than one compound (S) may be present in the suspension.

The suspension may optionally comprise other known additives, such as additional dispersing agents, anti-foaming agents, and the like.

Compound (S) may be selected from the group consisting of the acid phosphate esters of formula (I):

wherein:
R represents a linear or branched, saturated or unsaturated, aliphatic hydrocarbon group having from 1 to 24 carbon atoms or an aromatic hydrocarbon having from 6 to 24 carbon atoms;
M is H, Na or K,
n is an integer from 0 to 12, preferably from 4 to 10, more preferably from 4 to 8;
a is an integer equal to 1 or 2, and b is 3−a.

In formula (I), R is preferably an aliphatic hydrocarbon group, linear or branched, saturated or unsaturated, having from 6 to 20 carbon atoms or an aromatic hydrocarbon having from 6 to 24 carbon atoms. In a preferred embodiment R is an aliphatic hydrocarbon group, linear or branched, saturated or unsaturated, having from 6 to 20 carbon atoms, more preferably from 10 to 20 carbon atoms or an aromatic hydrocarbon having from 8 to 24 carbon atoms. R may conveniently be an aliphatic hydrocarbon group, linear or branched, saturated or unsaturated, having from 14 to 20 carbon atoms.

The number of ethylene oxide units in compounds of formula (I), n, may advantageously be 2, 3, 4, 5, 6, 7, 8, 9 or 10. Preferably, n is 3, 4, 5, 6, 7, 8. More preferably, n is 4, 5, 6, 7, 8. In some embodiments n is advantageously 4 or 5.

Notable non-limiting examples of suitable acid phosphate esters of formula (I) are those wherein $R=C_8H_{17}$, $n=2$, $a=1$ or 2 and $b=1$ or 2; $R=C_{13}H_{27}$, $n=4$ or 6, $a=1$ or 2 and $b=1$ or 2; R=$C_{18}H_{35}$, n=5, a=2, b=1; R=$C_{16}H_{33}$, n=5, a=2, b=1; R=2,4-$(C_8H_{19})$—$C_6H_3$, n=5, a=1, 2, b=1, 2.

Compound (S) may be selected from the group consisting of the amines of formula (II):

$$NR^1R^2R^3 \qquad (II)$$

wherein each $R^1$, $R^2$, $R^3$ is independently selected from the group consisting of H, linear or branched, saturated or unsaturated, aliphatic hydrocarbon groups having from 1 to 24 carbon atoms, preferably from 10 to 24 carbon atoms, and —$(CH_2CH_2O)n^1H$, wherein each $n^1$ is an integer from 1 to 16, preferably from 1 to 5, more preferably 1, with the proviso that $R^1$, $R^2$ and $R^3$ are not H at the same time. Each $R^1$, $R^2$ or $R^3$ may be independently selected from the group consisting of H, linear or branched, saturated or unsaturated, aliphatic hydrocarbon groups having from 10 to 22 carbon atoms, such as 10, 12, 14, 16, 18, 20 or 22 carbon atoms, and —$(CH_2CH_2O)n^1H$, wherein each $n^1$ is an integer from 1 to 16, preferably from 1 to 5, more preferably 1.

Notable non-limiting examples of suitable amines of formula (II) are those wherein $R^1=R^2=H$ and $R^3=C_{18}H_{35}$; wherein $R^1=R^2=$—$CH_2CH_2OH$ and $R^3=C_{18}H_{35}$ or; wherein $R^1=R^2=$—$(CH_2CH_2O)_n{}^1H$, the sum of $n^1$ in $R^1$ and $R^2$ is 5 and $R^3=C_{18}H_{35}$.

Compound (S) may be selected from the group consisting of the succinate esters of formula (III):

$$R^4OC(O)CH_2CHM^1C(O)OR^5 \qquad (III)$$

wherein $R^4$ and $R^5$ are independently selected from the group consisting of the linear or branched, saturated or unsaturated, aliphatic hydrocarbon groups having from 1 to 24 carbon atoms, preferably from 4 to 18 carbon atoms, and $M^1$ is either H or $SO_3Na$. Notable non-limiting example of a compound (S) of formula (III) is a compound wherein $R^4=R^5=C_8H_{17}$ and $M^1$ is $SO_3Na$.

Compound (S) may alternatively be selected from the group consisting of the functionalised oligomers comprising recurring units deriving from at least one conjugated diene monomer.

The expression "oligomer" is used herein to refer to compounds having a number average molecular weight from 1000 to 80000 g/mol, preferably from 1000 to 70000 g/mol. The number average molecular weight of the functionalised oligomer may be in the range from 2000 to 50000 g/mol. The number average molecular weight is typically determined using gel permeation cromatography.

Suitable functionalised oligomers are preferably liquid at room temperature.

The functionalised oligomer comprises recurring units deriving from at least one conjugated diene monomer.

The conjugated diene monomer may be 1,3-butadiene, 2-alkyl-1,3-butadiene, 2-methyl-1,3-butadiene (isoprene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and/or 1,3-cyclooctadiene. The conjugated diene monomer is preferably 1,3-butadiene, and/or 2-methyl-1,3-butadiene.

The functionalised oligomer may optionally comprise recurring units deriving from at least one aromatic vinyl compound such as styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. The aromatic vinyl compound is preferably selected from styrene, α-methylstyrene and 4-methylstyrene.

The term "functionalised" is used herein to refer to compounds comprising at least one functional group. The functional group may be at the chain end and/or along the molecular chain of the oligomer.

Notable non-limiting examples of suitable functional groups are those selected from the group consisting of amino groups, amide groups, imino groups, imidazole groups, urea groups, alkoxysilyl groups, hydroxyl groups, epoxy groups, carboxyl groups, carbonyl groups, mercapto groups, isocyanate groups, nitrile groups, acid anhydride groups such as carboxylic anhydride groups, dicarboxylic acid monoester groups and dicarboxylic acid monoamide groups.

The functional group is preferably selected from the group consisting of alkoxysilyl groups, hydroxyl groups, epoxy groups, carboxyl groups, carbonyl groups, mercapto groups, isocyanate groups, nitrile groups, acid anhydride groups such as carboxylic anhydride groups, dicarboxylic acid monoester groups and dicarboxylic acid monoamide groups.

In one embodiment the functional group is selected from the group consisting of carboxyl groups and acid anhydride groups such as carboxylic anhydride groups, dicarboxylic acid monoester groups and dicarboxylic acid monoamide groups.

Oligomers comprising carboxyl-based functional groups may be prepared for instance by the reaction of an unsaturated carboxylic acid and/or an unsaturated carboxylic acid derivative with an oligomer comprising recurring units deriving from a conjugated diene monomer. Examples of unsaturated carboxylic acids or unsaturated carboxylic acid derivatives include maleic acid, fumaric acid, itaconic acid, (meth)acrylic acid, maleic anhydride, itaconic anhydride, maleic acid monoesters, itaconic acid monoesters and fumaric acid monoesters; (meth)acrylate esters such as glycidyl (meth)acrylate and hydroxyethyl (meth)acrylate; unsaturated dicarboxylic acid monoamides such as maleic acid monoamides, itaconic acid monoamides and fumaric acid monoamides.

Functionalised oligomers comprising carboxyl-based functional groups suitable for the suspension of the invention are for instance those made commercially available by Kuraray under the trade name LIR-403, LIR-410, UC 120M, UC 203M or those made commercially available by Evonik under the trade name POLYVEST® MA 75 or POLYVEST® MA 120.

In another embodiment, the functional group is selected from the group of alkoxysilyl groups, notably those comprising at least one group of formula —$SiR^6{}_d(OR^7)_{3-d}$ wherein each of $R^6$ is independently selected from alkyl, aryl or alkylaryl groups having from 1 to 16 carbon atoms; each $R^7$ is independently selected from alkyl groups having from 1 to 4 carbon atoms and, optionally, $R^6$ and $R^7$ may independently be substituted with one or more groups selected from alkyl groups having from 1 to 4 carbon atoms, alkoxy groups having from 1 to 4 carbon atoms, aryl groups having from 6 to 12 carbon atoms or alkylaryl groups having from 7 to 10 carbon atoms, di($C_1$-$C_7$-hydrocarbyl)amino, bis(tri ($C_1$-$C_{12}$-alkyl)silyl)amino, tris($C_1$-$C_7$-hydrocarbyl)silyl and thioalkyl groups having from 1 to 12 carbon atoms; and d is an integer selected from 1, 2 and 3. Preferably, each of $R^7$ is independently selected from methyl, ethyl, iso-propyl, n-propyl, n-butyl, iso-butyl, or tert-butyl; each of $R^6$ is independently selected from alkyl groups having from 1 to 6 carbon atoms, aryl groups having from 6 to 12 carbon atoms or alkylaryl groups having from 7 to 10 carbon atoms.

Suitable functionalised oligomers comprising alkoxysilyl functional groups are for instance those described in US2014/0121316, WO2017/211876 and WO2016/180649.

Miscibility in n-hexadecane has been selected to represent the miscibility of compound (S) in liquid (L). The expression "is miscible in liquid (L)" when referred to compound (S) has to be interpreted that when submitted to the Miscibility Test defined hereafter, compound (S) provides a clear solution in n-hexadecane in the temperature range from 20 to 50° C. Preferably compound (S) is miscible in n-hexadecane at 20° C.

In a preferred embodiment of the invention the at least one compound (S) is selected among the compounds as defined under i., ii., iii. and iv. above which are miscible in n-hexadecane and that provide large exploitable areas in terms of compound (S) to silica ratio in Demand Curve tests, as hereinafter described.

In said embodiment, suspensions comprising, preferably consisting of, n-hexadecane, silica particles in an amount of 20% by weight with respect to the total weight of the suspension, and compound (S) in a compound (S) to silica ratio in the range from 30 to 60% by weight exhibit viscosities of less than 100 mPa·s, preferably of less than 80 mPa·s, typically between 1 and 70 mPa·s, preferably between 5 and 50 mPa·s. Viscosities are measured at room temperature using a capillary viscosimeter.

In some instances, viscosities in the range defined above may be advantageously obtained over a larger compound (S) to silica ratio such as for instance over the range from 20 to 50% by weight.

In a further embodiment of the invention the at least one compound (S) is selected among the compounds as defined under i., ii., iii. and iv. above which, in addition to the above, also provide large exploitable areas in terms of compound (S) to silica ratio in Demand Curve tests performed in o-xylene.

In said embodiment, suspensions comprising, preferably consisting of, o-xylene, silica particles in an amount of 20% by weight with respect to the total weight of the suspension, and compound (S) in a compound (S) to silica ratio in the range from 30 to 60% by weight exhibit viscosities at room temperature of less than 70 mPa·s, preferably of less than 50 mPa·s, typically between 1 and 50 mPa·s, preferably between 2 and 40 mPa·s.

A further object of the invention is a process for the preparation of the suspension of silica particles which comprises milling silica in the presence of liquid (L) and at least one compound (S) in a wet milling apparatus.

The process may advantageously comprise the following steps:
  i. providing a solution of the at least one compound (S) in liquid (L);
  ii. adding silica; and
  iii. milling in a wet milling apparatus.

The wet milling apparatus used in the process is not limited provided it is capable of grinding silica particles to a particle size of less than 600 nm and to efficiently disperse them in liquid medium (L). The wet milling apparatus may be for instance selected among basket mills, ball or bead mills, ultrasonic mills, and high pressure homogenizers.

In a preferred embodiment of the process, the wet milling apparatus is a basket mill apparatus.

The silica is preferably precipitated silica. Any precipitated silica may be used in the inventive process. Mention may be made for instance of the following commercially available precipitated silicas: Zeosil® 1165MP, Zeosil® 1115MP, Zeosil® Premium 200MP, Zeosil® 1085GR, Zeosil® 195HR, Zeosil® 165GR, Zeosil® 115GR, Zeosil® HRS 1200MP, Zeosil® 195GR, Zeosil® 185GR, Zeosil® 175GR, Zeosil® 125GR (all commercially available from Solvay), Ultrasil® 5000GR, Ultrasil® 7000GR, Ultrasil® 9000GR, Ultrasil® VN3GR, Hi-Sil® EZ 160G-D, Hi-Sil® EZ 150G, Hi-Sil® 190G, Hi-Sil® 200G-D, Hi-Sil® HDP-320G, Hi-Sil® 255CG-D, Zeopol® 8755LS, Zeopol® 8745, Newsil® 115GR, Newsil® 2000MP, Tokusil® 315.

The precipitated silica may be in any physical form, such as powder, granules or spherical beads Typically, the mean average size of said beads is of at least 50 µm, preferably of at least 80 µm, especially at least 100 µm, for example at least 150 µm. The mean average size of the beads is generally not more than 300 µm or even not more than 270 µm. The mean size is determined according to standard NF X 11507 (December 1970) by dry sieving and determination of the diameter corresponding to a cumulative oversize of 50%.

When in the form of a powder, the mean average size is of at least 3 µm, preferably of at least 10 µm, especially at least 15 µm. The mean average size may advantageously be comprised between 15 and 60 µm.

Granules generally have a size of at least 1 mm, for instance comprised between 1 and 10 mm along the major dimension.

The ratio silica to liquid (L) during the process may be equal or higher than the ratio defined for the suspension.

In an embodiment of the process the milling step is performed in a step-wise manner adding increasing amounts of silica to the solution of compound (S) in liquid (L) to reach the final desired amount of silica in the suspension.

The addition of silica to the solution of compound (S) to liquid (L) in step (ii) of the process may lead to the formation of a paste which is then subjected to milling in the wet milling apparatus.

Mixing of compound (S), liquid (L) and silica may be performed in the wet milling apparatus or in a separate vessel.

The temperature of the milling step (iii) is not particularly limited provided it does not exceed the boiling temperature of liquid (L). Milling step (iii) is typically performed at temperatures from 10 to 40° C., and typically at room temperature.

At the end of milling step (iii) the suspension is discharged. The concentration of the silica particles in the suspension may or may be not adjusted by adding additional amounts of liquid (L).

The suspension of the invention finds use in the preparation of compositions comprising silica particles and at least one polymer.

The compositions may be prepared by mixing the suspension of silica particles in liquid (L) comprising at least one compound (S) with a solution or suspension of a polymer in an organic liquid in any suitable mixing apparatus.

In general, the mixing step is carried out at a temperature of between 10° C. and 80° C., for example between 15° C. and 35° C.

The organic liquid may be the same or different from liquid (L). Typically the polymer solution or suspension is provided in an aromatic liquid.

The organic polymer solution or suspension may come from dissolving or dispersing the solid polymer in the organic liquid. However, it preferably comes from polymerizing the corresponding monomers in the organic liquid, e.g. by solution polymerization.

The polymer content of the solution employed is usually between 5 and 30% by weight.

The amounts of raw materials used are such that the composition contains, in general, from 10 to 150 parts, preferably from 25 to 100 parts and in particular from 40 to 75 parts, of silica particles per 100 parts of polymer.

Within the context of the invention, the term "polymer" is also understood to mean "copolymer". The polymer used is in general, but not exclusively, an elastomer.

As possible polymers, mention may especially be made of diene polymers, particularly diene elastomers.

For example, mention may be made of natural rubber, polymers deriving from aliphatic or aromatic monomers containing at least one unsaturated group (such as, especially, ethylene, propylene, butadiene, isoprene and styrene), polybutyl acrylate, silicone elastomers, thermoplastic elastomers, functionalized elastomers, halogenated polymers and blends thereof.

The polymer employed may be EPDM. Preferably, an SBR (styrene-butadiene copolymer) and/or a BR (polybutadiene) styrene/isoprene/butadiene copolymers and any functionalized versions of them is employed.

The composition prepared starting from the silica particle suspension of the invention is advantageous, in the preparation of rubber composition, instead of dry-blending, or in combination with dry blending, as it allows a better mixing and interaction of the silica particles with the polymeric matrix. It additionally reduces the amount of energy needed for dry mixing the ingredients in an internal rubber mixer as the organic solvent mixing process requires less energy.

The silica particle suspension of the invention may be used also for the preparation of compositions with monomers which can be polymerized in the presence of the silica particles. Notable, non-limiting examples of suitable polymerizable monomers are for instance compounds having an ethylenically unsaturated bond, compounds having an epoxy ring, compounds having an oxetane ring, and compounds having a vinyl ether structure.

The concentration of silica particles in compositions comprising polymerizable monomers is typically of 5 to 70% by weight, preferably of 15 to 60% by weight.

The invention will be now described with reference to the following examples, whose purpose is merely illustrative and not intended to limit the scope of the invention.

EXAMPLES

Analytical Methods
Determination of Particle Size by Dynamic Light Scattering (DLS)

The suspension was homogenized manually in a flask. The measure was performed on a laser diffraction instrument such as Malvern Zetasizer, Nano ZS. The parameters set for the determination were the following:
Temperature=20° C.
Solvent viscosity=0.98 mPa·s
Solvent refractive index=1.426
silica particle refractive index=1.440 (absorption=0.01)
Measure angle=90°
analysis mode 'multi narrow mode (high resolution)'
Sample diluted at 1% in the measurement solvent
Miscibility Test The miscibility of compound (S) in n-hexadecane was determined at 20° C. by mixing each compound (S) in a 20 mL vial at a concentration of 20% by weight with respect to the total weight of the solution. The solubility was evaluated macroscopically by visual observation after one day. Compound (S) was defined as "non-miscible" if the liquid system was not homogeneous. The results of miscibility test are reported in Table 1.

Compounds (S) which were not miscible with n-hexadecane at 20° C., were tested temperatures up to 50° C.

The entry in Table 1 shows the temperature at which miscibility was observed, when different from 20° C.

TABLE 1

| Compound ref. | Trade name | Formula | Miscible |
| --- | --- | --- | --- |
| A | Rhodafac ® RS 410 | Formula (I) wherein R = $C_{13}H_{27}$, n = 4, a = 1, 2 and b = 1, 2 | Y |
| B | Rhodafac ® PA35 | Formula (I) wherein R is a mixture of C16 and C18 radicals, predominantly R is $C_{18}H_{35}$, n = 5, a = 1, 2 and b = 1, 2 | Y |
| C | Rhodafac ® RS 610 | Formula (I) wherein R = $C_{13}H_{27}$, n = 6, a = 1, 2 and b = 1, 2 | N |
| D | Rhodafac ® RS 710 | Formula (I) wherein R = $C_{13}H_{27}$, n = 10, a = 1, 2 and b = 1, 2 | N |
| E | Lubrhophos ® LM 400 | R = 2,4-$(C_8H_{19})$—$C_6H_3$, n = 5, a = 1, 2, b = 1, 2 | Y (at 45° C.) |
| F | Fentamine ® AOV | Formula (II) wherein $R^1 = R^2$ = H and $R^3 = C_{18}H_{35}$ | Y |
| G | Rhodameen ® O2V | Formula (II) wherein $R^1 = R^2$ = —$CH_2CH_2OH$ and $R^3 = C_{18}H_{35}$. | Y |
| H | Rhodameen ® PN 430 | Formula (II) wherein Formula (II) wherein $R^1 = R^2$ = —$(CH_2CH_2O)n^1H$ wherein the total amount of units ($CH_2CH_2O$) is 5 and $R^3 = C_{18}H_{35}$. | Y |
| I | Aerosol ® OT-100% | Formula (III) wherein $R^4 = R^5 = C_8H_{17}$, $M^1 = SO_3Na$ | Y |
| J | Rhodafac ® PA15 | Formula (I) wherein R = $C_8H_{17}$, n = 2, a = 1, 2 and b = 1, 2 | Y |
| K | Rhodafac ® PA32 | Formula (I) wherein R is a mixture of C16 and C18 radicals, predominantly R is $C_{18}H_{35}$, n = 3, a = 1, 2 and b = 1, 2 | Y |

Compounds A to K are commercially available from Solvay SA.

Determination of Demand Curves

Demand curves were obtained using n-hexadecane or o-xylene as the liquid medium at a silica loading of 20% by weight and a compound (S) to silica ratio from 2 to 50% by weight.

Sample Preparation 750 mg of 2 mm glass beads were placed in 4 mL vial containing 1500 mg of n-hexadecane or o-xylene.

The vials were placed on a Quantos robotic platform (accuracy: 0.1-0.5%) to distribute silica particles (20% wt. i.e. 300 mg) in the vial.

Compound (S) was diluted at 20% by weight in the liquid before addition to the vial of compound (S) in the required to compound (S) to silica ratio.

Formulations were agitated using a benchtop vortex for 60 min.

Viscosity measurements were performed at room temperature using a capillary viscosimeter (Viscoman, Gilson).

Figure 1:
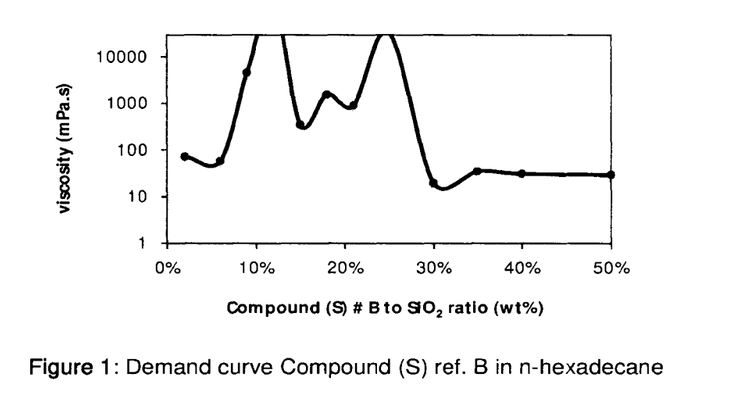
FIG. 1: is a graph of viscosity vs. compound (S) to $SiO_2$ ratio using precipitated silica at 20 wt % in n-hexadecane wherein compound (S) is compound B.
Figure 2:
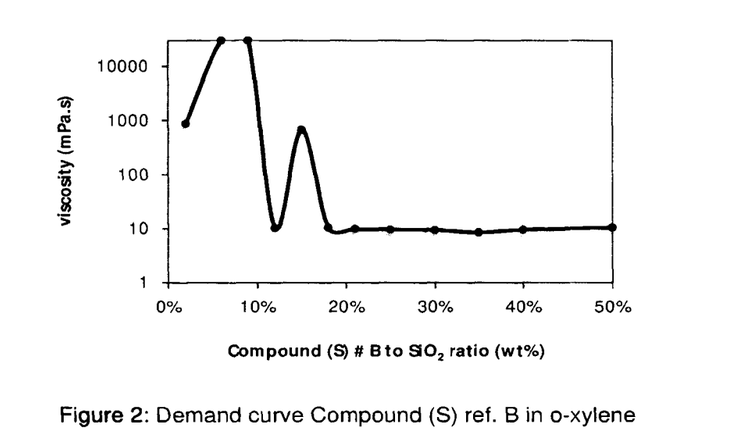
FIG. 2: is a graph of viscosity vs. compound (S) to $SiO_2$ ratio using precipitated silica at 20 wt % in o-xylene wherein compound (S) is compound B.

Demand curves obtained using compound B as defined in Table 1 in n-hexadecane and o-xylene are provided in FIGS. 1 and 2, respectively.

Figure 3:
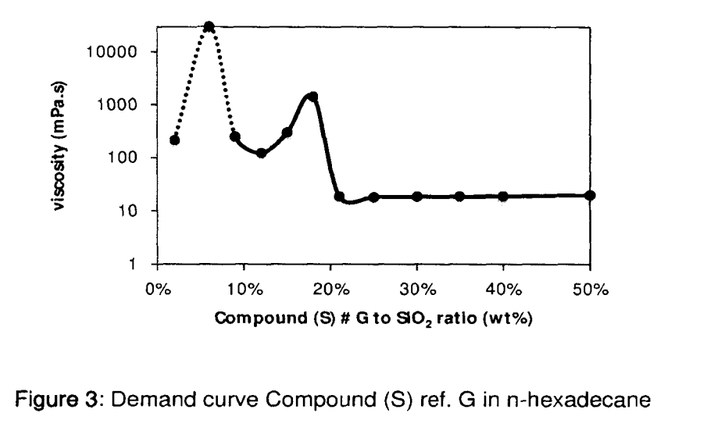
FIG. 3: is a graph of viscosity vs. compound (S) to $SiO_2$ ratio using precipitated silica at 20 wt % in n-hexadecane wherein compound (S) is compound G.
Figure 4:
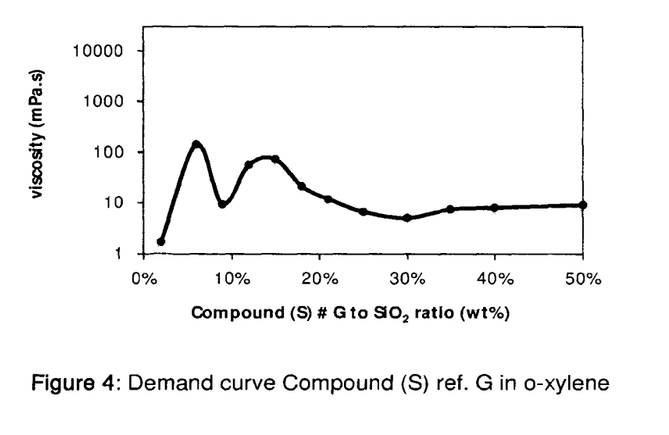
FIG. 4: is a graph of viscosity vs. compound (S) to $SiO_2$ ratio using precipitated silica at 20 wt % in o-xylene wherein compound (S) is compound G.

Demand curves obtained using compound G as defined in Table 1 in n-hexadecane and o-xylene are provided in FIGS. 3 and 4, respectively.

Examples 1-8—General Procedure for the Preparation of Silica Suspensions

In a 1 liter dispersion container, compound (S) was dissolved cyclohexane. The solution was stirred at 500 rpm using a dispersion disc. Silica (Zeosil® Premium 200 MP, Solvay) was added progressively.

After the total amount of silica was added, the system was stirred until a viscous fluid was obtained.

A basketmill head (50 mL, 1.1-1.4 mm $ZrO_2$—$CeO_2$ beads (density=6.2)) was placed on the stirring apparatus. The stirring speed was adjusted from 2000 to 3000 rpm according to the viscosity of the mixture. Stirring time was typically about 1.30 hour.

The compositions of the silica suspensions are reported in Table 2 together with the measure of the silica particle size in the suspension.

TABLE 2

| Ex | Compound (S) | Ratio (S)/$SiO_2$ (wt %) | $SiO_2$ (wt %) | Cyclohexane (g) | Compound (S) (g) | $SiO_2$ (g) | Particle size (nm) |
|---|---|---|---|---|---|---|---|
| # 1 | B | 30 | 33.3 | 460.4 | 84.1 | 278.2 | 44 |
| # 2 | C | 25 | 28.2 | 438.3 | 48.7 g | 194.1 | 122 |
| # 3 | E | 25 | 28.5 | 470.4 | 52.2 g | 207.9 | 122 |
| # 4 | F | 25 | 20.0 | 508.9 | 39.3 | 138.6 | 106 |
| # 5 | G | 25 | 34.2 | 464.6 | 69.8 | 277.6 | 106 |
| # 6 | J | 25 | 28.2 | 470.0 | 52.8 | 207.9 | na |
| # 7 | K | 25 | 28.2 | 470.2 | 52.0 | 207.9 | 712 |
| # 8 | B | 25 | 28.2 | 470.0 | 52.4 | 207.9 | 106 |

The size of silica particles in composition #6 could not be determined as the system formed a gel and not a suspension.

The distribution of particle sizes in composition #7 was polydisperse with a main population centered at 712 nm and a second one at 2.3 µm.

The stability of the remaining suspensions was determined by visual inspection. The suspensions were found to be stable over time.

Example 9: Preparation of Compositions Comprising Silica Particles, Compound B and SBR Polymer 40 g of a solution containing functionalized SBR rubber (Sprintan 4602 provided by Trinseo) was added to 160 g of cyclohexane. After obtaining a uniform mixture, 400 g of a silica suspension of Example 8 was added into the polymer mixture to obtain different loadings of silica in the polymer (10 wt %, 15 wt %, 20 wt % and 33 wt %).

The compositions thus obtained (compositions PS1 to PS4) were deposited on a 20×15 centimeter glass plate using a 75 µm bar coater and dried under air at 20-25° C. The visual inspection of the coated glass plates showed that good dispersions of silica particles were obtained at loadings of 10 to 20 wt %, with no visible $SiO_2$ agglomerates.

Solid compositions containing the polymer and silica particles were prepared from compositions PS1-PS4 as follows: the liquid composition was placed in a 2 liter stripper reactor and stirred at 70-75 rpm for 15 minutes. The reactor was heated at a temperature between 50° and 80° C. and placed under vacuum at 80-500 mbar. The solvent was extracted from the mixture and collected in a condenser and in a dry ice trap.

After the complete extraction of the solvent, the silica-polymer composition was withdrawn from the reactor as a rubbery solid.

Example 10: Preparation of Compositions Comprising Silica Particles, Compound G and SBR Polymer The procedure of Example 9 was followed using the same functionalized SBR rubber and the composition of Example 5 to obtain a composition (PS5) containing 10 wt % of silica in the polymer.

Example 11—Comp. Examples 1-2

Silica-filled elastomeric compositions were prepared. The compositions, expressed as parts by weight per 100 parts of elastomers (phr), are described in Table 3.

TABLE 3

| | Comp. Ex 1 | Comp. Ex 2 | Example 11 |
|---|---|---|---|
| SBR (1)- as such added to internal mixer | 100 | 100 | 45 |
| Total SBR (1) in the final composition | 100 | 100 | 100 |
| PS5 (2) added to internal mixer | 0 | 0 | 125 |
| Compound #G as such added to internal mixer | 0 | 13.8 | 0 |
| Total Compound #G in the final composition | 0 | 13.8 | 13.8 |
| Silica S1 (3) as such added to internal mixer | 55 | 55 | 0 |
| Total silica S1 (3) in the final composition | 55 | 55 | 55 |
| TESPT (4) | 4.8 | 4.8 | 4.8 |
| TDAE oil | 10 | 2 | 2 |
| stearic acid | 3.0 | 3.0 | 3.0 |

TABLE 3-continued

|  | Comp. Ex 1 | Comp. Ex 2 | Example 11 |
|---|---|---|---|
| Rhenogran ZnO-80 | 2.5 | 2.5 | 2.5 |
| 6PPD (5) | 1.9 | 1.9 | 1.9 |
| Rhenogran S-80 | 1.5 | 1.5 | 1.5 |
| Rhenogran CBS-80 (6) | 2.0 | 2.0 | 2.0 |
| Rhenogran DPG-80 (7) | 3.0 | 3.0 | 3.0 |

(1) functionalized SBR rubber Sprintan 4602 provided by Trinseo
(2) PS5 obtained from Example 10
(3) Silica S1:Zeosil ® Premium 200MP from Solvay:$S_{CTAB}$ 197 m²/g; $S_{BET}$ 219 m²/g; d50(CPS) 99 nm
(4) Bis[3-(triethoxysilyl)propyl] Tetrasulfide, TESPT Luvomaxx, from LEVOSS France sarl
(5) N-(1,3-Dimethylbutyl)-N-phenyl-para-phenylenediamine, Vulkanox 4020/LG
(6) N-Cyclohexyl-2-benzothiazolesulfenamide, Rhenogran CBS-80 from Rhein Chemie
(7) Diphenylguanidine, Rhenogran DPG-80 from RheinChemie The amount of composition PS5 in Example 11 was calculated to provide the same amount of silica as in Comp. Examples 1 and 2 and the same amount of compound #G as in Comp. Example 2.

The amount of processing oil in Example 11 and in Comp. Example 2 was adjusted to obtain a final composition having the same Shore A hardness as the composition of Comp. Example 1.

The process for the preparation of the composition of Example 11 was carried out in one single non-productive phase allowing to save energy of mixing with respect to a standard operating mixing which uses two phases.

Before mixing, 50 g of composition PS5 was calendered in an open mill heated at 50° C. to have a sheet of material for easier handling.

The internal mixer used for the preparation of the composition was an internal mixer of Brabender brand (capacity 70 mL). During the first step of mixing silane was added first and then TDAE oil and all other ingredients were added.

The duration of the mixing phase was about 7-8 minutes and rotors speed was set to obtain a level of temperature of 155° C.

The process for the preparation of the rubber compositions of Comparative Examples 1 and 2 was carried out in two successive preparation phases: a first phase of thermomechanical working, followed by a second phase of mechanical working at temperatures of less than 145° C. to introduce the vulcanization system.

The first phase was carried out using a mixing device, of internal mixer type, of Brabender brand (capacity of 70 mL). During the first phase the elastomers and silica (introduction in instalments) were mixed with the coupling agent, compound #G and the other additives (DPG, stearic acid, resin, ZnO, 6-PPD). The duration of this phase was around 6 min.

After cooling the mixture (temperature of less than 100° C.), the vulcanization system was added during the second phase. This phase was carried out on an open mill, preheated to 50° C. The duration of this phase was between 3 and 5 minutes. Each final mixture was subsequently calendered in the form of plaques with a thickness of 2-3 mm.

Vulcanization of Uncured Compositions in ODR Rheometer

Measurements were carried out over 30 minutes at 160° C. at 3° amplitude oscillation using an ODR MONSANTO rheometer according to the NF ISO 3417 standard. The rheometric torque was measured as a function of time. This allows to infer the vulcanization reaction of the compositions and to monitor the following parameters: minimum torque (minT), which reflects the torque of uncured compound at the tested temperature; maximum torque (maxT) which reflects the torque of cured compound; delta torque (ΔT=maxT−minT) which reflects the degree of rubber crosslinking. The results obtained are shown in Table 4.

TABLE 4

|  | Ex. 11 | Comp. Ex. 1 | Comp. Ex. 2 |
|---|---|---|---|
| minT (N · m) | 9.7 | 18.9 | 15.8 |
| ΔT (maxT − minT) (N · m) | 73.8 | 77.7 | 71.2 |

The uncured composition of Example 11 shows a reduction in the minimum torque with respect to composition of both Comparative examples. Processability of the uncured rubber mixture of Example 11 is improved compared to the processability of compositions prepared by separately mixing silica and compound #G to the functionalized rubber, or prepared in the absence of compound #G. This advantage is obtained without any loss of vulcanization density, as shown by the values of the ΔT of the composition of Example 11, which is comparable to the one of Comp. Example 1.

The composition of Example 11 also exhibits comparable reinforcement properties. Tensile and Shore A measurements were carried out after vulcanization at 160° C./30 minutes.

Uniaxial tensile tests were carried out in accordance with standard NF ISO 37 with H2 type test specimens at a rate of 500 mm/min on an Instron 5564 device. The percentage Moduli (Mx) correspond to the stress measured at x % of tensile strain expressed in MPa. Tensile strength (TS) is expressed in MPa, Elongation at Break (EB) is expressed in %.

Shore A hardness measurement on the vulcanisates was carried out according to standard ASTM D 2240 on a Hildebrand durometrer. The given value was measured at 3 seconds. Results are shown in Table 5.

TABLE 5

|  | Example 11 | Comp. Ex 1 | Comp. Ex 2 |
|---|---|---|---|
| Shore A hardness | 62 | 63 | 60 |
| M200 (MPa) | 7.6 | 11.1 | 8.5 |
| RI (M200/M100) | 2.9 | 2.7 | 2.6 |
| TS (MPa) | 22.2 | 17.6 | 19.1 |
| TS × EB (MPa %) | 8860 | 4829 | 6690 |

While all compositions exhibit similar hardness, the composition of Example 11 provides an advantage in terms of reinforcement index (RI) as well as excellent ultimate properties (TS or TSxEB) with respect to the compositions of both comparative examples.

The invention claimed is:
1. A suspension of silica particles comprising:
a liquid [liquid (L)] selected from the group consisting of the linear or branched, saturated or unsaturated, aliphatic and cycloaliphatic hydrocarbons having from 6 to 30 carbon atoms and of the aromatic hydrocarbons having from 6 to 10 carbon atoms,
silica particles, wherein the silica particles are precipitated silica particles, and
at least one compound [compound (S)] selected from the group consisting of:
the acid phosphate esters of formula (I)

$$P(O)((OCH_2CH_2)_nOR)_a(OM)_b \qquad (I)$$

wherein:
R represents a linear or branched, saturated or unsaturated, aliphatic hydrocarbon group having from 1 to 24 carbon atoms or an aromatic hydrocarbon having from 6 to 24 carbon atoms; M is H, Na or K, n is an integer from 4 to 8;

a is an integer equal to 1 or 2, and b is 3-a;

characterised in that said compound(S) is miscible in liquid (L) in the temperature range from 20° C. to 50° C.

2. The suspension according to claim 1 wherein the silica particles are characterized with a particle size of less than 600 nm as measured by dynamic light scattering.

3. The suspension according to claim 1 wherein the silica particles are present in an amount of from 1 to 60% by weight with respect to the total weight of the suspension.

4. The suspension according to claim 1 wherein liquid (L), is selected from the group consisting of n-hexane, n-heptane, n-octane, n-nonane, n-decane, n-dodecane, n-hexadecane, and cyclohexane.

5. The suspension according to claim 1 wherein compound(S) is present in an amount of from 5 to 50% by weight with respect to the dry weight of the silica particles.

6. The suspension according to claim 1 wherein compound(S) is such that the viscosity, measured at room temperature, of suspensions comprising n-hexadecane, silica particles in an amount of 20% by weight with respect to the total weight of the suspension, and compound(S) in a compound(S) to silica ratio in the range from 30 to 60% by weight is less than 100 mPa·s.

7. The suspension according to claim 1 wherein compound(S) is such that the viscosity, measured at room temperature, of suspensions comprising o-xylene, silica particles in an amount of 20% by weight with respect to the total weight of the suspension, and compound(S) in a compound (S) to silica ratio in the range from 30 to 60% by weight is less than 50 mPa·s.

8. A process for the preparation of the suspension of claim 1 comprising milling the precipitated silica in the presence of liquid (L) and of at least one compound(S) in a wet milling apparatus.

9. The process of claim 8 which comprises the following steps:
 i. providing a solution of at least one compound (S) in liquid (L),
 ii. adding the precipitated silica; and
 iii. milling in a wet milling apparatus.

10. A composition comprising the suspension of claim 1 and at least one polymer.

11. A method for the preparation of the composition of claim 10 comprising mixing the suspension of claim 1 with a solution or suspension of the polymer in an organic liquid.

12. A composition comprising the suspension of claim 1 and at least one polymerizable monomer.

* * * * *